D. R. DARNELL.
CORN PLANTER ATTACHMENT.
APPLICATION FILED MAR. 5, 1912.
1,117,343. Patented Nov. 17, 1914.
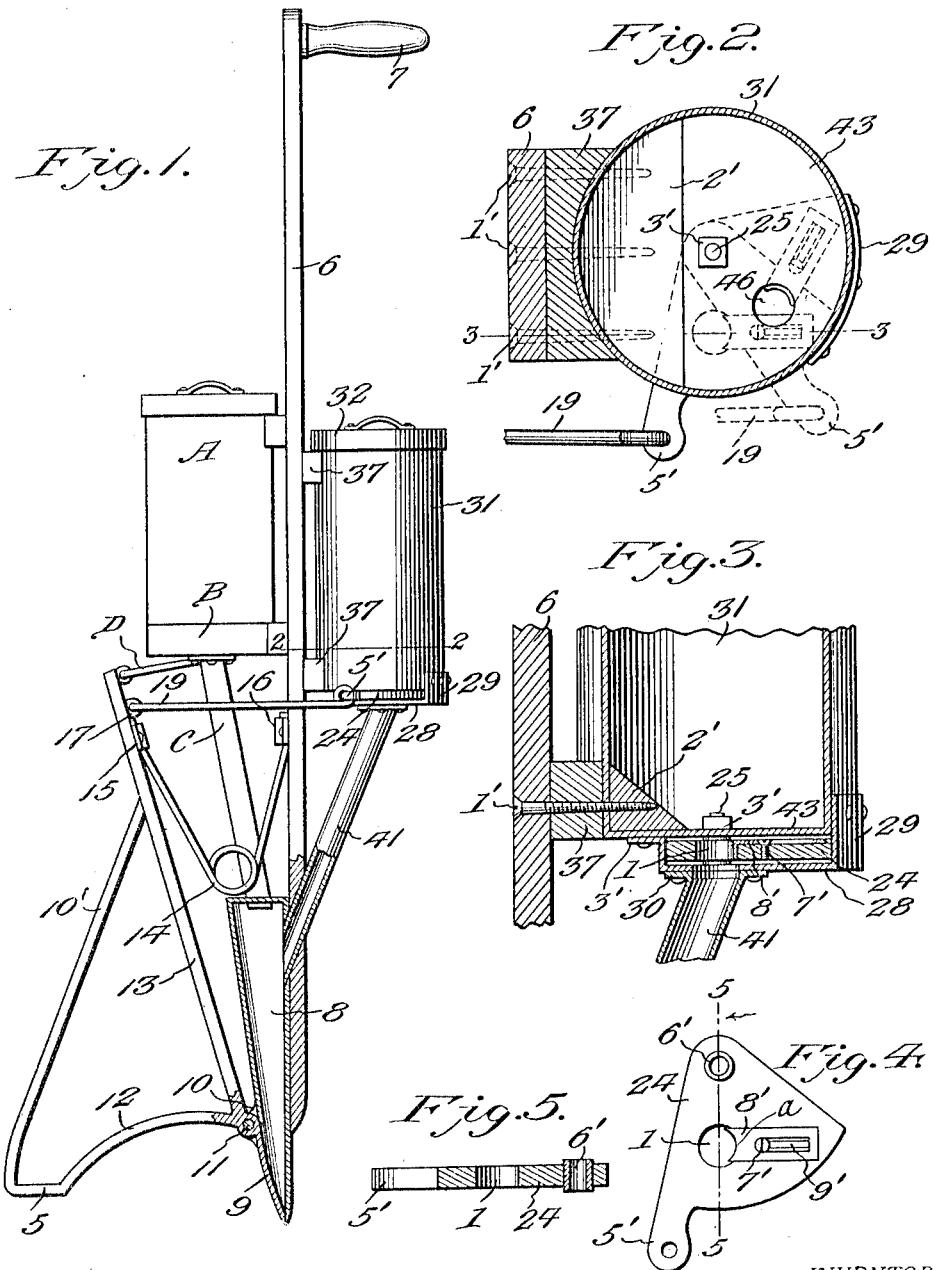

UNITED STATES PATENT OFFICE.

DAVID R. DARNELL, OF WEIDMAN, MICHIGAN.

CORN-PLANTER ATTACHMENT.

1,117,343.     Specification of Letters Patent.     Patented Nov. 17, 1914.

Application filed March 5, 1912. Serial No. 681,826.

*To all whom it may concern:*

Be it known that I, DAVID R. DARNELL, a citizen of the United States, and a resident of Weidman, in the county of Isabella and State of Michigan, have invented certain new and useful Improvements in Corn-Planter Attachments, of which the following is a specification, reference being had to the accompanying drawings.

This invention has relation to an attachment employed in connection with a hand operated or so-called walking corn planter, and comprises an auxiliary reservoir and dropping mechanism, the object of my invention being to provide a device of this general character, of a simple and inexpensive nature and of a durable and compact construction, which may be capable of adjustment upon the staff of a hand corn planter to serve as an auxiliary seed or fertilizer distributer, so that two kinds of seed or seed and fertilizer may be simultaneously deposited, both dropper mechanisms being simultaneously actuated.

Another object is to provide a device of the character described with a fertilizer distributer that will not clog.

With these and other objects in view the present invention consists in the combination and arrangement of parts as will be hereinafter more fully described and finally pointed out in the appended claim, it being further understood that changes in the specific structure shown and described may be made within the scope of the claim, without departing from the spirit of the invention.

In the accompanying drawing forming a part of this specification, and in which like numerals of reference indicate similar parts in the several views: Figure 1, is a side elevational view of a hand corn planter provided with an auxiliary reservoir including my invention, parts being broken away to disclose the construction. Fig. 2, is a section on line 2, 2, of Fig. 1. Fig. 3, is an enlarged broken detached detail, showing the lower portion of the auxiliary hopper in cross section. Fig. 4, is a detail of the sweep. Fig. 5, is a section on line 5, 5 of Fig. 4.

It is often desirable to deposit a dash of plaster or fertilizer at the time a seed is planted, or it may be desirable to plant two kinds of seed at one dropping. In my present invention I provide an attachment to a hand operated or so-called hand corn planter, by means of which a fertilizer may be deposited at the same instant that the main or primary seed dropping mechanism is operated to drop the seed.

In the accompanying drawings the numeral 6, designates a staff and 7, the handle by means of which the staff is operated. As shown, the staff at its lower end is provided with the hollow shoe 8, which shoe at its lower end has a side opening closed by means of the valve plate 9. The shoe 8, as shown, is approximately wedge-shaped in cross section, so that the upper end is adapted to receive the ends of the feed pipes C led into the same. Near its lower end and above the side opening, the shoe is provided with the outstanding pin ears 10, giving support to the pin 11, and this pin in turn gives pivotal support to the valve plate 9, from which is continued upwardly the lever 13. This lever 13, is reinforced by the outstanding approximately V-shaped bracket 12, having the flat foot formed portion 5, the upper end 10', of the bracket being secured to the lever 13. Secured to the lever 13, near its upper end, is an ear 15, while held to the staff 6, is an ear 16, and held below these ears 15, and 16, are the ends of a coil spring 14, this spring 14, normally forcing the member 13, outward, so that the valve plate 9, normally closes the lower end of the dropper shoe 8, as shown in Fig. 1.

A, represents the main hopper having the bottom B, within which is held a dropper disk of conventional construction, and extending from this bottom B, is the main feed pipe C, led into the shoe 8, as disclosed. The dropper mechanism within the main reservoir A, is operated by means of the pawl arm D, in any usual manner.

Secured to the staff 6, adjacent to the main reservoir A, is the auxiliary reservoir 31, closed by means of the cap 32. This auxiliary reservoir 31, as shown in Fig. 3, has a bottom 43, having the feed opening 46, shown in Fig. 2. The reservoir 31, is secured to the staff 6, by means of the block 37, the screws 1' passing through this block, openings within the housing 31, and into the block 2'. Centrally held within an aperture in the bottom 43, is the pivot bolt 25, which gives pivotal support to the sweep 24, shown in detail in Fig. 4.

Secured to the bottom 43, of the reservoir 31, is a jacket, comprising the bottom plate 28, from which extends the oppositely positioned securing flanges 29 and 3'. The ends of the jacket are open, as will be understood in referring to Fig. 1, where what may be termed the forward open end of the jacket is shown. The rear or opposite end is similarly constructed.

Pivotally held upon the bolt 25, is the sweep 24, having the extending apertured arm 5'. This sweep is approximately triangular and near the end of the opposite arm 5', carries the bearing collar 6'. This collar extends beyond the faces of the sweep, as shown in Fig. 5 to hold said sweep in spaced relation to the reservoir bottom and bottom plate. This sweep has the opening 1, into which extends the lip $a$, of the slide 8', having the slot 9', engaged by the set screw 7', as clearly shown in Fig. 4. This lip $a$, extends outward as far as the end of the collar 6', so that the lip will scrape upon the bottom of the plate 28.

As shown in Fig. 3, there is a space above and below the sweep 24. This is necessary so that the fertilizer will not pack within the jacket and prevent the operation of the sweep. Secured to the ear 17, carried upon the upper end of the lever 13, is the pitman 19, which at its end is secured to the arm 5'. Extending from the flange 30, is the feed pipe 41, which passes through an opening within the staff 6, as disclosed in Fig. 1, and empties into the hollow shoe 8. The sweep 24, as shown in Figs. 3 and 4, has the dropper opening 1, which may be brought immediately over the dropper opening within the bottom 28, surrounded by the flange 30. In sliding the member 8', backward or forward, the escape opening within the sweep may be reduced. Now, when it is desired to deposit a dash of plaster or fertilizer with the seed, the operator places the seed in the regular seed reservoir A, and the fertilizer or plaster within the auxiliary reservoir 31. The reservoirs being properly charged, the device is operated in shoving the shoe into the earth. The downward movement, of the shoe has been plunged into the earth, the operator tilts the staff 6, toward the bracket side, which results in the valve 9, remaining stationary while the lower end of the shoe 8, travels away from the valve 9, permitting any seed that may have been deposited within the shoe, together with the fertilizer, being simultaneously dropped. As soon as the planter is withdrawn, the spring 14, forces the bracket outward, resulting in the valve plate 9, closing the lower end of the dropper shoe. In the tilting of the staff 6, to actuate the valve plate 9, the operator also insured the dropper mechanism being actuated, for as the staff 6, approached the lever 13, the pitman 19, as well as the pawl D, is advanced toward the hoppers A and 31, resulting in the pawl D, operating the main dropper mechanism, while the pitman actuates the sweep 24, permitting a suitable amount of seed and fertilizer dropping through the tube 41, into the shoe 8. The instrumentalities can be so arranged that the seed may be deposited below the fertilizer or above the fertilizer, or where plaster is used, the same may be deposited at the instant the seed is deposited.

The attachment of the auxiliary reservoir and dropping mechanism to the planter may be effected in any suitable workmanlike manner and if desired the auxiliary reservoir may be detachably secured to the staff. The device is simple and inexpensive in construction and both durable and efficient in operation.

Having thus described my said invention, what I claim as new and desire to secure by United States Letters Patent is:

The combination in a hand planter of the following instrumentalities, a staff, a reservoir secured to said staff having a feed opening within its bottom and a centrally positioned aperture, a pivot bolt within said aperture, a bottom plate secured to the bottom of said reservoir said pivot bolt passing through said bottom plate said bottom plate having a feed opening registering with the feed opening within said reservoir bottom, a feed pipe extending from said last mentioned opening, a sweep upon said bolt having an extending arm and a dropper opening arranged at times to register with said feed openings, a bearing collar fixed to said sweep working upon said bolt said collar extending beyond the upper and lower face of said sweep to hold the same in spaced relation to said bottom plate and reservoir bottom, a lever secured to said staff, a rod connecting said lever to said sweep arm, and a spring to hold said lever, as and for the purpose set forth.

In testimony whereof I affix my signature, in presence of two witnesses.

DAVID R. DARNELL.

Witnesses:
 LOUIS LAPEARL,
 LEE V. MILLER.

Copies of this patent may be obtained for five cents each, by addressing the "Commissioner of Patents, Washington, D. C."